United States Patent [19]

Tourtellotte

[11] 3,722,189
[45] Mar. 27, 1973

[54] APPARATUS FOR REMOVING HYDROCARBONS FROM A GAS STREAM

[75] Inventor: John F. Tourtellotte, Westfield, N.J.

[73] Assignee: Chemical Construction Corporation, New York, N.Y.

[22] Filed: May 24, 1971

[21] Appl. No.: 146,186

[52] U.S. Cl. ............................. 55/389, 55/DIG. 30
[51] Int. Cl. ............................................. B01d 53/04
[58] Field of Search ....... 55/74, 75, DIG. 30, 387, 389

[56] References Cited

UNITED STATES PATENTS

| | | | |
|---|---|---|---|
| 2,909,415 | 10/1959 | Hoydny | 55/DIG. 30 |
| 3,176,461 | 4/1965 | Calvert | 55/DIG. 30 |
| 3,633,343 | 1/1972 | Mark | 55/DIG. 30 |
| 3,154,389 | 10/1964 | Hayes et al. | 55/DIG. 30 |
| 3,191,587 | 6/1965 | Hall | 55/DIG. 30 |

Primary Examiner—Charles N. Hart
Attorney—J. L. Chaboty

[57] ABSTRACT

A fluid-solid contactor is disclosed which provides maximum contact area with minimum displacement, by passing the fluid into a preferably cylindrical container containing a coaxial internal preferably cylindrical solids bed, and diverting the fluid by means of an annular inclined baffle to attain fluid flow through the bed. The invention is applicable to the removal of hydrocarbons from an engine exhaust gas by absorption into a solid absorbent.

16 Claims, 3 Drawing Figures

JOHN F. TOURTELLOTTE
INVENTOR.

APPARATUS FOR REMOVING HYDROCARBONS FROM A GAS STREAM

BACKGROUND OF THE INVENTION

1. Field of the Invention

The invention relates to the contacting of fluids with solid particles, for such purposes as catalysis, absorption and/or adsorption. The invention is especially concerned with the adsorption or absorption into a solid absorbent bed, of residual unburned or thermally degraded hydrocarbons present in the exhaust gas of an engine, so that the treated exhaust gas may be safely discharged to the atmosphere without causing air pollution. The prevention of air pollution due to the emission of unburned or thermally degraded hydrocarbons in the exhaust gas of engines, such as internal combustion engines as provided for automobiles, trucks, buses and the like has assumed great importance. In recent years it has been recognized that the exhaust gas discharged from internal combustion engines is a serious source of air pollution, especially in metropolitan areas. In some areas a so-called smog is generated due to atmospheric inversions and accumulation of such exhaust gases in the atmosphere. Recent attempts to prevent such air pollution have concentrated on the destruction or elimination of noxious components by catalysts, especially by admixture of secondary air into the exhaust gas after initial catalytic reduction of nitrogen oxides, followed by catalytic oxidation of residual hydrocarbons, carbon monoxide, etc., in various types of apparatus or catalytic mufflers specially designed for this purpose.

2. Description of the Prior Art

Numerous catalysts, catalytic devices and mufflers, and treatment systems have been proposed for the processing of exhaust gas emitted by engines, so as to control engine exhaust emissions and prevent the discharge of noxious components into the atmosphere. Apparatus for carrying out the procedures are described in U.S. Pat. Nos. 3,380,810; 3,325,256; 3,255,123; 3,222,140; 3,186,806; 3,180,712; 3,169,836; 3,168,806; 3,146,073 and 3,086,839 and U.S. Pat. application Ser. No. 33,359 filed Apr. 30, 1970, now U.S. Pat. No. 3,656,915, which describes a two-stage apparatus for carrying out the process with interstage air injection. In general, the prior art as enumerated supra does not accommodate for high emissions and concentrations of unburned hydrocarbon vapors in the exhaust gas during certain periods of the engine operating cycle, such as at startup of a cold engine. The absorption and/or adsorption of hydrocarbon vapors from the exhaust gas of an engine is described in the U.S. Pat. application of John F. Tourtellotte et al., Ser. No. 131,279 filed Apr. 5, 1971, now U.S. Pat. No. 3,699,683.

SUMMARY OF THE INVENTION

In the present invention, an apparatus is provided for contacting fluids with solids, which is specifically applicable to the treatment of engine exhaust gas containing relatively large proportions of unburned or thermally degraded hydrocarbons or other organics, so as to selectively absorb and/or adsorb the hydrocarbons from he exhaust gas stream and thereby prevent air pollution. The term hydrocarbons will be understood to encompass all of these types of components, and absorption of the hydrocarbons will be understood to encompass adsorption. Engine exhaust gas containing high amounts or concentrations of these components is generally produced during the first few minutes of startup of an engine, especially when the engine is cold at startup. This relatively cold gaseous mixture is passed through a bed of discrete solid particles of a suitable absorbent agent, disposed in the apparatus of the present invention, which selectively absorbs the hydrocarbon vapor, so that the residual gaseous phase may be safely discharged to atmosphere without causing air pollution. The absorbent bed may become laden with absorbed hydrocarbon during this initial period of operation, which may be of a duration of one to ten minutes, depending on atmospheric or initial engine temperature or the type of engine. The bed may be subsequently desorbed by passing a small stream of hot exhaust gas through the bed, and recycling the resulting exhaust gas-hydrocarbon vapor mixture to the engine intake appurtenances.

The apparatus of the invention generally includes a preferably cylindrical container with a preferably cylindrical baffle coaxially disposed within the container. A cylindrical bed of discrete solid particles is disposed or mounted within the cylindrical baffle, generally by providing a foraminous disc-shaped baffle across each end of the cylindrical baffle, to form an inner chamber filled with the solid particles. An inclined annular baffle is provided between the cylindrical baffle and the container wall, and the fluid stream is preferably passed into the device by means of a duct which extends to an opening in the wall of the container. The fluid stream flows in the annular space between the container and the cylindrical baffle, and is diverted by the annular baffle so as to flow radially inwards and through one foraminous baffle, through the bed of solid particles, and through the other foraminous baffle. Then, the treated fluid is diverted by the other side of the annular baffle so as to flow to an outlet opening generally in the opposite side of the container, from which the treated fluid is removed by a second duct.

The principal advantage of the invention is that the apparatus may be oriented horizontally with a relatively small vertical displacement, and thus the apparatus, when employed for removal of hydrocarbons from an engine exhaust gas, may be readily mounted under a vehicle in which the engine is mounted. Another advantage is that the apparatus provides uniform distribution of a fluid stream in a bed of solid particles. A further advantage is that the fluid stream passes through the device with low pressure drop. An additional advantage is that the apparatus is compact and easy to assemble.

It is an object of the present invention to provide an improved apparatus for contacting a fluid stream with solids.

Another object is to provide an apparatus for removal of hydrocarbons from engine exhaust gas by contacting the exhaust gas with a solid absorbent.

A further object is to provide an apparatus for removing hydrocarbon vapors from engine exhaust gas which is flat and may be readily mounted below a vehicle in which the engine is disposed.

An additional object is to provide an apparatus for passing a fluid stream in contact with a bed of solid particles in which the fluid stream is uniformly distributed in the bed and passes through the device with low pressure drop.

These and other objects and advantages of the present invention will become evident from the description which follows.

DESCRIPTION OF THE DRAWINGS AND PREFERRED EMBODIMENTS

Referring now to the drawings.

Figure 1:
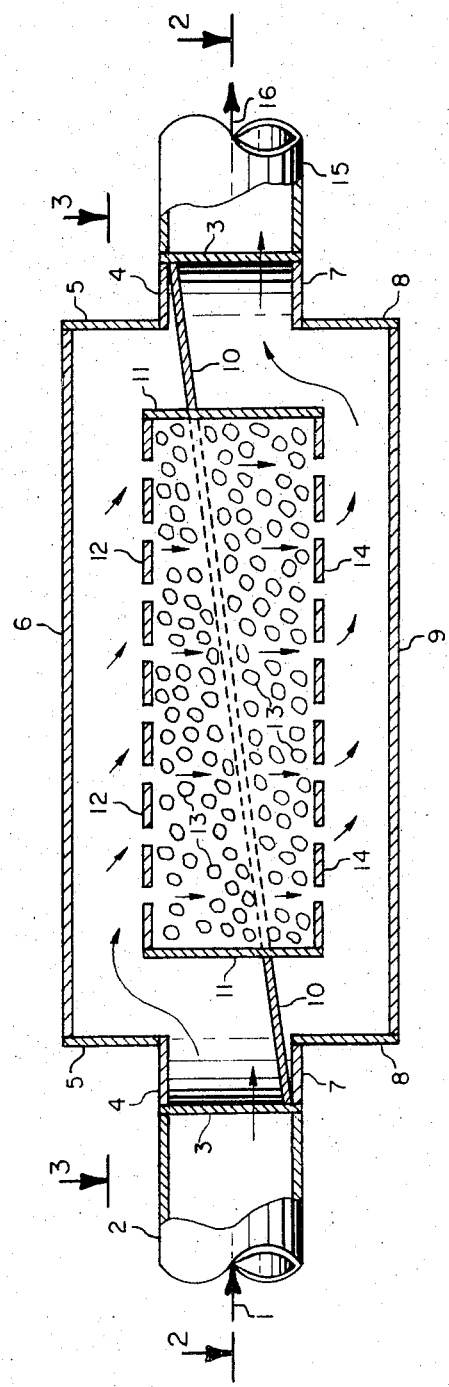
FIG. 1 is a sectional elevation view of a preferred embodiment of the apparatus.

Referring now to FIG. 1, the apparatus is shown in a horizontal position, typically as installed beneath a vehicle such as an automobile, truck, bus, tractor or motorcycle, for the treatment of engine exhaust gas to remove hydrocarbons. The engine exhaust gas stream 1, which may contain added air, is passed via duct or pipe 2 into a generally cylindrical outer container generally defined by the vertically oriented cylindrical baffle 3, the upper ring-shaped horizontal baffle 4, the upper vertical cylindrical baffle 5, the upper flat horizontal disc-shaped baffle 6, the lower ring-shaped horizontal baffle 7, the lower vertical cylindrical baffle 8 and the lower flat horizontal disc-shaped baffle 9. The pipe 2 terminates at an opening in the wall of baffle 3.

An annular inclined ring-shaped baffle 10 extends between baffle 3 and the inner vertical cylindrical baffle 11. In other words, annular baffle 10 is in the form of a flat circular ring external to the vertical cylindrical baffle 11, and extending outwards from the outer surface of baffle 11 to contact with cylindrical baffle 3. The baffle 10 is inclined upwards from a lower perimeter connection with the bottom of baffle 3 at the gas inlet opening, to an upper perimeter connection with the upper end of baffle 3 at the gas outlet from the container. The baffle 11 is coaxially and concentrically aligned within baffle 3, and baffle 11 defines the outer periphery of the solid absorbent bed, as will appear infra.

The engine exhaust gas flowing laterally inwards through the side opening in baffle 3 and into the annular space between baffle 3 and baffle 11 is diverted upwards by the inclined baffle 10, and the gas stream flows radially inwards between baffle 6 and the upper disc-shaped foraminous baffle 12 which is disposed across the upper end of baffle 11. The gas stream next flows downwards through the openings or perforations in baffle 12, and into the solid absorbent bed consisting of particles 13, which consist of any suitable solid absorbent for hydrocarbon vapor. Thus, the particles 13 may consist of an active hydrocarbon absorbent selected from the group consisting of activated carbon, zeolite, activated alumina, fuller's earth, kaolin, organic resin, or the like, or mixtures thereof. The hydrocarbon vapor content of the engine exhaust gas stream is thus absorbed by the solid particles 13, which are disposed in a generally cylindrical bed defined by the vertical cylindrical baffle 11, upper foraminous disc-shaped baffle 12, and the lower foraminous disc-shaped baffle 14 which extends across the lower end of baffle 11 and supports the particles 13 in the bed.

The treated exhaust gas discharged downwards from bed 13 and through the openings or perforations in baffle 14 now flows radially outwards between baffle 14 and lower baffle 9, and laterally upwards between baffles 11 and 3 and below baffle 10, to a gas outlet opening in the wall of baffle 3, from which the duct 15 conducts the treated exhaust gas stream 16 to further treatment or atmospheric discharge.

Figure 2:
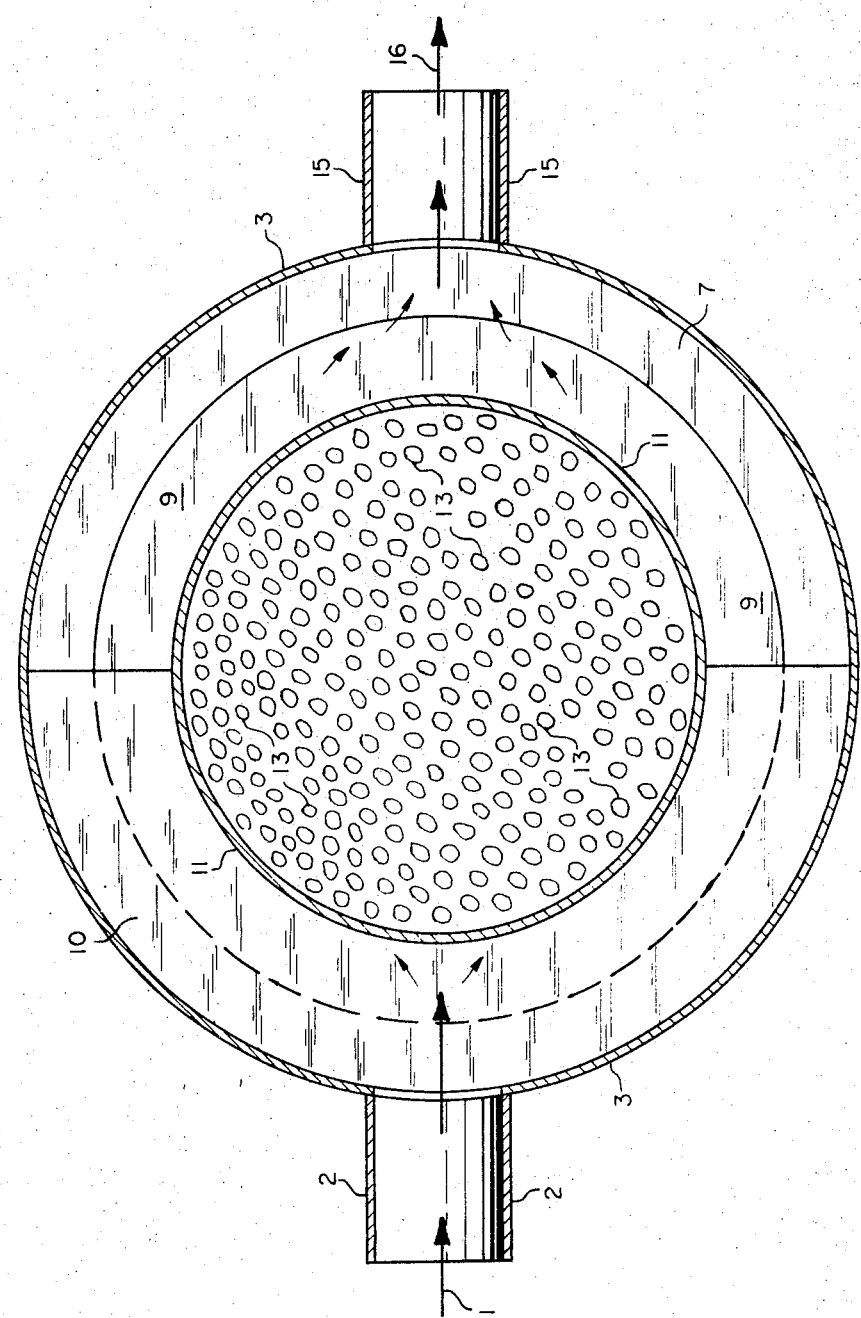
FIG. 2 is a sectional plan view of FIG. 1, taken on section 2—2.

Referring now to FIG. 2, which is a sectional plan view of the device, the concentric arrangement of the inner cylindrical absorbent bed 13, baffle 11 and baffle 3 is shown, as well as the lower half of the annular baffle 10 which extends between baffles 11 and 3.

Figure 3:
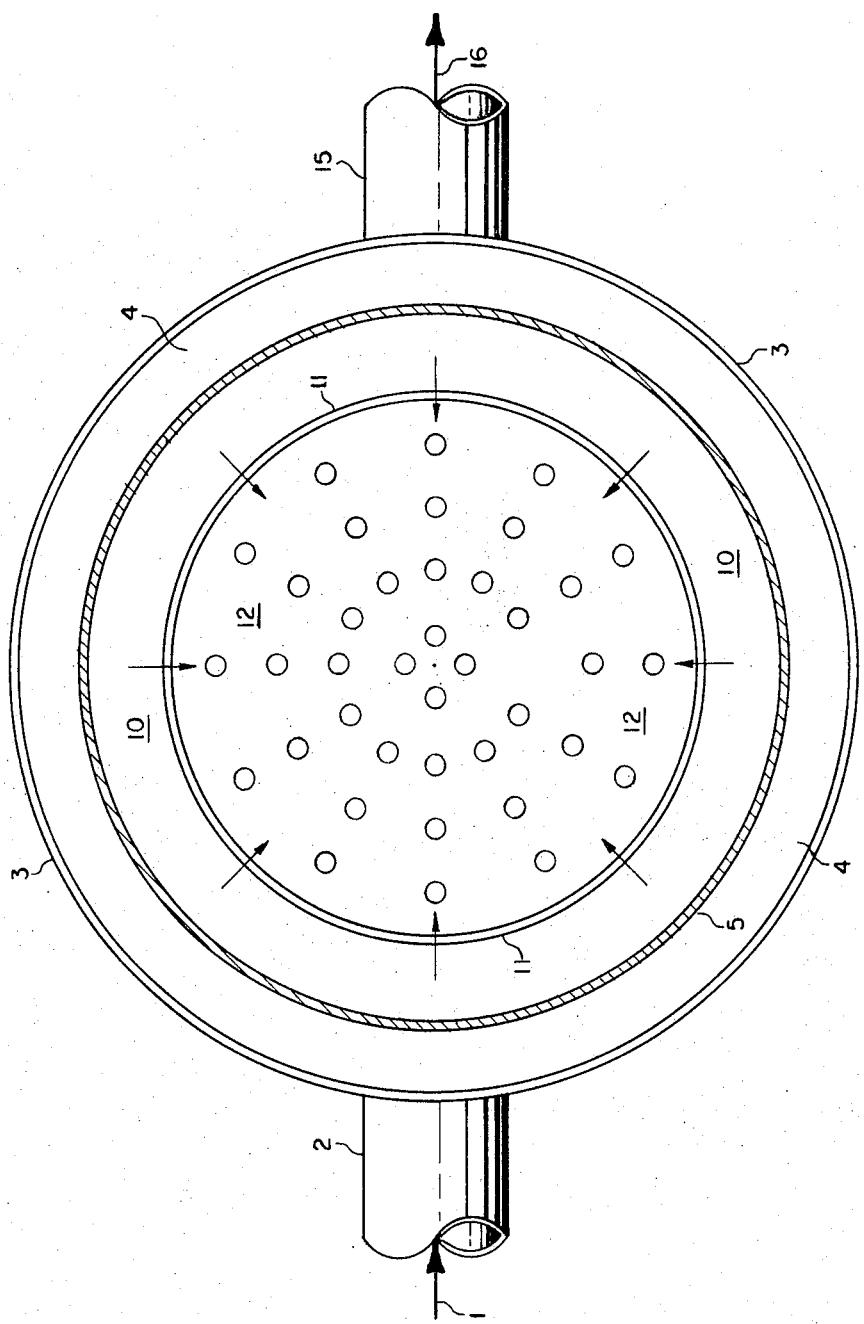
FIG. 3 is a plan view of FIG. 1 taken on section 3—3.

FIG. 3 is a sectional plan view which shows a typical arrangement or pattern of the perforations in the upper foraminous baffle 12, as well as the concentric arrangement of baffles 11, 5 and 3.

Numerous alternatives within the scope of the present invention will occur to those skilled in the art. Thus, the device may be oriented horizontally as shown, or in an inclined position or even a vertical position. The device may alternatively be square, rectangular, oval or elliptical in cross-section in suitable instances. The device is generally applicable to the contacting of a fluid stream with solid particles, however the invention is especially applicable to the removal of hydrocarbons from engine exhaust gas as discussed supra. The device may be employed in conjunction with or following a one or two-stage catalytic muffler for the elimination of noxious components from engine exhaust gas, as generally described in the U.S. Pat. application of John F. Tourtellotte et al., Ser. No. 131,279, filed Apr. 5, 1971, now U.S. Pat. No. 3,699,683. The flow of the fluid stream, such as engine exhaust gas, through the device may be alternatively attained by passing the fluid stream into the device via duct 15, and removing the treated fluid via duct 2. In this case, flow of the fluid stream through baffle 11 and in contact with solid particles 13 would be in an upwards direction. Regeneration of the solid absorbent, when the engine is hot and emission of hydrocarbon vapor is relatively low, may be attained by the periodic or continuous flow of a small bleed stream of hot exhaust gas through the device, either via duct 2 or duct 15, with recycle of the bleed stream containing desorbed hydrocarbon vapors to the engine for subsequent combustion and elimination of the recovered hydrocarbon vapors. Finally, the baffle 3 may alternatively be of an extended length and dimension so as to directly contact baffles 6 and 9, which in this case would be of greater diameter. In this case, the baffles 4, 5, 7 and 8 would be omitted. However, in most instances the baffles 4, 5, 7 and 8 will be provided in order to provide a restricted clearance relative to the upper end of baffle 11, and thereby attain uniform distribution of the inlet gas about baffle 11 and above baffle 10.

I claim:

1. An apparatus for contacting a fluid stream with discrete solid particles which comprises a circular container having disc shaped walls, a bed of solid particles coaxially disposed in said container and bounded by a first baffle, said first baffle being spaced from the wall of said container and coaxially disposed within said container, a second baffle, said second baffle being an annular ring and inclined and extending between said first baffle and the wall of said container, inlet means to pass a fluid stream into one end of said container, whereby said fluid stream is diverted by said second baffle and flows through said bed, and outlet means to remove the treated fluid stream from the other end of said container.

2. The apparatus of claim 1, in which said container, bed and first baffle are cylindrical and coaxial.

3. The apparatus of claim 2, in which said container and cylindrical first baffle are vertically oriented about a vertical axis, and said inclined annular second baffle is inclined at an acute angle from a horizontal plane.

4. The apparatus of claim 3, in which said inlet means is a first duct which extends horizontally into said container above the lower end of said inclined annular second baffle, and said outlet means is a second duct which extends horizontally from said container below the upper end of said inclined annular second baffle.

5. The apparatus of claim 1, in which said fluid stream is a gaseous stream.

6. The apparatus of claim 4, in which said gaseous stream includes exhaust gas from an engine, and said solid particles are particles of an active absorbent for hydrocarbon vapors.

7. The apparatus of claim 5, in which said engine is an internal combustion engine mounted in a vehicle selected from the group consisting of an automobile, a truck, a bus, a tractor and a motorcycle.

8. The apparatus of claim 5, in which said solid absorbent particles contain an active hydrocarbon absorbent selected from the group consisting of activated carbon, zeolite, activated alumina, fuller's earth, kaolin, and organic resin, and mixtures thereof.

9. An apparatus for contacting a fluid stream with discrete solid particles which comprises an inner cylindrical baffle, an outer cylindrical baffle, said outer baffle being concentrically disposed about said inner baffle, a first disc-shaped baffle, said first baffle being foraminous and extending across one end of said inner baffle, a second disc-shaped baffle, said second baffle being foraminous and extending across the other end of said inner baffle, a plurality of discrete solid particles, said solid particles being disposed within said inner baffle and between said first baffle and said second baffle, a third disc-shaped baffle, said third baffle being coaxial with said first and second baffles and spaced adjacent to said first baffle and external to said inner baffle, first fluid closure means extending between the outer circular periphery of said third baffle and one end of said outer baffle, a fourth disc-shaped baffle, said fourth baffle being coaxial with said first and second baffles and spaced adjacent to said second baffle and external to said inner baffle, second fluid closure means extending between the outer circular periphery of said fourth baffle and the other end of said outer baffle, an annular fluid diversion baffle, said annular baffle extending between said inner baffle and said outer baffle, the plane of said annular baffle being nonperpendicular to the axis of said inner baffle, said annular baffle thereby extending at an inclined angle transversely between the ends of said outer baffle, inlet means to pass a fluid stream between said inner and outer baffles and in contact with one side of said annular baffle, whereby said fluid stream flows radially inwards between said first baffle and said third baffle, through said inner baffle and in contact with said solid particles, radially outwards between said second baffle and said fourth baffle, and in contact with the other side of said annular baffle, and outlet means to remove the fluid stream from between said inner baffle and said outer baffle adjacent to the other side of said annular baffle.

10. The apparatus of claim 9, in which said inner and outer baffles are vertically oriented about a vertical axis, said first, second, third and fourth baffles are horizontal, and said annular baffle is inclined at an acute angle from a horizontal plane.

11. The apparatus of claim 10, in which said inlet means to pass said fluid stream between said inner and outer baffles is a means to pass said fluid stream above said annular baffle, whereby said fluid stream flows downwards through said inner baffle and in contact with said solid particles, and said outlet means to remove said fluid stream is a means to remove said fluid stream from below said annular baffle.

12. The apparatus of claim 11, in which said inlet means is a first duct which extends horizontally to said outer baffle, and said outlet means is a second duct which extends horizontally from said outer baffle.

13. The apparatus of claim 9, in which said fluid stream is a gaseous stream.

14. The apparatus of claim 13, in which said gaseous stream includes exhaust gas from an engine, and said solid particles are particles of an active absorbent for hydrocarbon vapors.

15. The apparatus of claim 14, in which said engine is an internal combustion engine mounted in a vehicle selected from the group consisting of an automobile, a truck, a bus, a tractor and a motorcycle.

16. The apparatus of claim 14, in which said solid absorbent particles contain an active hydrocarbon absorbent selected from the group consisting of activated carbon, zeolite, activated alumina, fuller's earth, kaolin and organic resin, and mixtures thereof.

* * * * *